United States Patent
Soeda et al.

(10) Patent No.: US 11,223,048 B2
(45) Date of Patent: Jan. 11, 2022

(54) BINDER

(71) Applicants: TPR CO., LTD., Tokyo (JP); iElectrolyte CO., LTD., Osaka (JP)

(72) Inventors: Kazunari Soeda, Osaka (JP); Takuya Takahashi, Osaka (JP)

(73) Assignees: TPR CO., LTD., Tokyo (JP); iElectrolyte CO., LTD., Osaka (JP)

( * ) Notice: Subject to any disclaimer, the term of this patent is extended or adjusted under 35 U.S.C. 154(b) by 0 days.

(21) Appl. No.: 16/970,264

(22) PCT Filed: Oct. 31, 2019

(86) PCT No.: PCT/JP2019/042717
§ 371 (c)(1),
(2) Date: Aug. 14, 2020

(87) PCT Pub. No.: WO2021/084671
PCT Pub. Date: May 6, 2021

(65) Prior Publication Data
US 2021/0135226 A1   May 6, 2021

(51) Int. Cl.
| | |
|---|---|
| *H01M 4/62* | (2006.01) |
| *C08K 3/22* | (2006.01) |
| *C08K 3/26* | (2006.01) |
| *C08K 5/098* | (2006.01) |
| *C08K 5/1545* | (2006.01) |
| *C08K 3/34* | (2006.01) |
| *C08K 3/36* | (2006.01) |

(52) U.S. Cl.
CPC ............ *H01M 4/622* (2013.01); *C08K 3/22* (2013.01); *C08K 3/26* (2013.01); *C08K 5/098* (2013.01); *C08K 5/1545* (2013.01); *C08K 3/346* (2013.01); *C08K 3/36* (2013.01); *C08K 2003/222* (2013.01); *C08K 2003/265* (2013.01)

(58) Field of Classification Search
CPC .......... H01M 4/622; C08K 3/22; C08K 3/26; C08K 5/098; C08K 5/1545; C08K 3/346; C08K 3/36; C08K 2003/222; C08K 2003/265
USPC ....................................................... 429/217
See application file for complete search history.

(56) References Cited

U.S. PATENT DOCUMENTS

| | | | |
|---|---|---|---|
| 6,262,167 B1 * | 7/2001 | Weitzel ............... | C04B 40/0039 524/513 |
| 2009/0317718 A1 | 12/2009 | Imachi et al. | |
| 2013/0209882 A1 | 8/2013 | Kim et al. | |
| 2014/0248534 A1 | 9/2014 | Chikugo et al. | |
| 2014/0295245 A1 | 10/2014 | Miyazaki | |
| 2014/0349184 A1 | 11/2014 | Chu et al. | |
| 2015/0263192 A1 | 9/2015 | Muschelknautz et al. | |
| 2018/0248191 A1 | 8/2018 | Liu et al. | |

FOREIGN PATENT DOCUMENTS

| | | |
|---|---|---|
| CN | 110249242 A | 9/2019 |
| EP | 1958985 A1 | 8/2008 |
| JP | 2007287390 A | 11/2007 |
| JP | 2009064564 A | 3/2009 |
| JP | 2011063673 A | 3/2011 |
| JP | 1979494 B2 | 7/2012 |
| JP | 2013165061 A | 8/2013 |
| JP | 5859548 B2 | 2/2016 |
| JP | 2016521907 A | 7/2016 |
| JP | 2018527710 A | 9/2018 |
| TW | 201415488 A | 4/2014 |
| WO | 2012073747 A1 | 6/2012 |
| WO | 2013069280 A1 | 5/2013 |

OTHER PUBLICATIONS

International Search Report, and English Translation thereof, for International Application No. PCT/JP2019/042717, dated Jan. 28, 2020, (8 pages).
Notification of Reasons for Refusal, English Translation thereof, for Japanese Application No. 2020-514763, dated Jun. 30, 2020, (5 pages).
E-Space English Abstract for CN 110249242 A.
E-Space English Abstract for TW 201415488 A.
Extended European Search Report for European Application No. 19914187.0, dated Mar. 19, 2021, (7 pages).

* cited by examiner

*Primary Examiner* — Josephine L Chang
(74) *Attorney, Agent, or Firm* — Kagan Binder, PLLC

(57) ABSTRACT

An aspect of the present invention provides a binder which makes it possible to obtain an electrode excellent in heat resistance. The binder contains: a re-emulsifiable resin powder coated with inorganic particles; and a metal-crosslinking thickening agent forming a hydrophobic gel by being crosslinked, in an aqueous system, via metal ions derived from an electrode active material.

10 Claims, No Drawings

BINDER

CROSS-REFERENCE TO RELATED APPLICATIONS

This application claims priority to International Application No. PCT/JP2019/042717, filed Oct. 31, 2019 and titled "BINDER," of which is incorporated herein by reference in its entirety.

TECHNICAL FIELD

The present invention relates to a binder which connects electrode materials of an electrochemical device.

BACKGROUND ART

Recently, electrochemical devices, which are to be mounted on, for example, mobile phones and electric vehicles, are under development. Among others, lithium-ion secondary batteries have an excellent charge-discharge efficiency and a high energy density, and make it possible to reduce the size and the weight of devices. Accordingly, lithium-ion secondary batteries are used as power sources for, for example, mobile devices, laptop personal computers, and domestic electric appliances, and further for hybrid vehicles and electric vehicles. Furthermore, lithium-ion secondary batteries are newly drawing attention as electricity storage devices which may be used for storage of generated electricity in combination with a natural energy system such as photovoltaic power generation or wind power generation.

Meanwhile, there is a technique for forming an electrochemically inert porous inorganic particle layer on an electrode so that heat resistance of a battery will be improved. For example, Patent Literature 1 discloses a positive electrode for a non-aqueous electrolyte secondary battery, the positive electrode including: a positive-electrode mix layer containing a positive electrode active material; and a porous inorganic particle layer formed on a surface of the positive-electrode mix layer. Such a porous inorganic particle layer is formed on the surface of the positive-electrode mix layer, by applying a slurry containing inorganic particles.

CITATION LIST

Patent Literature

[Patent Literature 1]
International Publication No. WO 2012/073747 (Publication Date: Jun. 7, 2012)

SUMMARY OF INVENTION

Technical Problem

In a case where the inorganic particle layer is formed by applying, for example, by gravure coating, the slurry containing the inorganic particles to an electrode which an electrode active material has been applied to and dried, the inorganic particle layer can be provided only in a surface portion of the electrode. In this case, although the inorganic particle layer is useful in protecting a separator facing the electrode, the inorganic particle layer may not provide thermal protection for an active material layer which is not in the surface portion of the electrode. This may result in deterioration of the active layer. Therefore, conventional techniques, like that disclosed in Patent Literature 1 described above, had a room for improvement, from the viewpoint of improving heat resistance.

An aspect of the present invention is attained in view of the above problem. An object of an aspect of the present invention is to provide a binder which makes it possible to obtain an electrode excellent in heat resistance.

Solution to Problem

In order to solve the above problem, the inventors of the present application have made diligent studies. As a result, the inventors have found that it is possible to provide a binder which makes it possible to obtain an electrode excellent in heat resistance, by using (i) a re-emulsifiable resin powder coated with inorganic particles and (ii) a metal-crosslinking thickening agent. The inventors thereby accomplished an aspect of the present invention. Specifically, the present invention encompasses the following aspects.

[1] A binder which connects electrode materials of an electrochemical device, the binder including:

a re-emulsifiable resin powder coated with inorganic particles; and a metal-crosslinking thickening agent forming a hydrophobic gel by being crosslinked, in an aqueous system, via metal ions derived from an electrode active material.

[2] A binder as described in [1], wherein: the re-emulsifiable resin powder has a structure in which a synthetic resin is coated with an emulsifier.

[3] The binder as described in [2], wherein: the synthetic resin has a glass transition temperature in a range of −40° C. to 25° C.

[4] The binder as described in [3], wherein: the synthetic resin is an emulsion of a polyacrylic acid copolymer resin or of a conjugated diene polymer.

[5] The binder as described in any one of [1] to [4], wherein: the inorganic particles are resistant to heat.

[6] The binder as described in any one of [1] to [5], wherein: the inorganic particles are contained in an amount of 1% by weight to 40% by weight with respect to a total amount of 100% by weight of the re-emulsifiable resin powder and the inorganic particles.

[7] The binder as described in any one of [1] to [6], wherein: a weight ratio of the metal-crosslinking thickening agent to the re-emulsifiable resin powder is in a range of 65:35 to 90:10.

[8] The binder as described in any one of [1] to [7], wherein: the metal-crosslinking thickening agent is (i) alginic acid or a salt thereof, fucoidan, alginic acid ester, karaya gum, carrageenan or a salt thereof, pectine, gellan gum, glucomannan, locust bean gum, xanthane gum, glucose, mannose, galactose, arabinose, fucose, ribose, fructose, carboxymethyl starch, carboxymethyl cellulose or a salt thereof, hydroxyethyl cellulose, hydroxypropyl methylcellulose, dextran, or hyaluronic acid, or (ii) a mixture thereof.

[9] The binder as described in any one of [1] to [8], wherein: the inorganic particles are made of (i) calcium carbonate, talc, mica, pyrophyllite, clay, dolomite, silicic acid anhydride, kaolin, silicon dioxide, aluminum silicate, aluminum hydroxide, aluminum oxide, a hydrate of aluminum oxide, magnesium oxide, calcium oxide, titanium oxide, barium titanate, or zirconium oxide, or (ii) a mixture thereof.

[10] A slurry for an electrode, including: a binder as described in any one of [1] to [9]; an electrode active material; and water.

[11] A slurry as described in [10], further including a neutralizer.

[12] An electrochemical device including: a positive electrode; a negative electrode; and an electrolyte between the positive electrode and the negative electrode, at least one of the positive electrode and the negative electrode including a binder as described in any one of [1] to [9].

Advantageous Effects of Invention

An aspect of the present invention can provide a binder which makes it possible to obtain an electrode excellent in heat resistance.

DESCRIPTION OF EMBODIMENTS

The following description will discuss details of embodiments of the present invention. The scope of the present invention is, however, not limited to the description of the embodiments. Besides the examples below, the present invention can also be modified and put into practice as appropriate within the scope in which the purpose of the present invention is not impaired.

Note that in the present specification, any numerical range expressed as "A to B" means "not less than A and not more than B" unless otherwise stated. Further, the terms "mass" and "weight" are regard as synonyms. Also, the terms "mass %" and "weight %" are regard as synonyms.

[1. Binder]

A binder in accordance with an embodiment of the present invention is a binder which connects electrode materials of an electrochemical device. The binder contains: a re-emulsifiable resin powder coated with inorganic particles; and a metal-crosslinking thickening agent forming a hydrophobic gel by being crosslinked, in an aqueous system, via metal ions derived from an electrode active material. The term "aqueous system" as used in the present specification means an environment in which water is present. Further, an aqueous medium means a medium which contains water.

The binder functions to connect electrode materials such as an electrode active material, a current collector, and a conductive auxiliary agent. In a case where a slurry is prepared by dispersing, in an aqueous medium, the binder, which contains (i) the re-emulsifiable resin powder coated with inorganic particles and (ii) the metal-crosslinking thickening agent, the inorganic particles on the re-emulsifiable resin powder are separated from the re-emulsifiable resin powder by the metal-crosslinking thickening agent. The inorganic particles thus separated are uniformly dispersed, so that a protective film containing the inorganic particles is formed. Then, a crosslinking reaction occurs between the metal-crosslinking thickening agent, which is contained in the protective film containing the inorganic particles, and a metal element on the surface of the electrode active material. As a result, the electrode active material coated with a protective layer can be obtained.

In other words, uniform dispersion of the inorganic particles in an aqueous slurry allows for formation of a coating film containing the inorganic particles and the metal-crosslinking thickening agent. Then, the coating film binds, by crosslinking, to a transition metal present on the electrode active material, and coats the surface of the electrode active material. As a result, the coating film becomes a heat-resistant protective layer of an electrode. The heat-resistant protective layer allows the electrode active material to be entirely and uniformly coated by the coating film, which contains the inorganic particles and the metal-crosslinking thickening agent. This further improves the heat resistance of the electrode as compared to a conventional method which allows for protection of only a surface of an active material layer. In other words, use of the binder in accordance with an embodiment of the present invention makes it possible to uniformly protect not only a surface layer portion of the electrode but also the electrode active material inside the electrode. Therefore, it is possible to improve the heat resistance. A characteristic of the heat resistance of a battery here can be, for example, a storage characteristic or cycle characteristic in a high-temperature state.

<1-1. Re-Emulsifiable Resin Powder>

The binder in accordance with an embodiment of the present invention contains a re-emulsifiable resin powder. The re-emulsifiable resin powder as used in the present specification means a powder which is obtained by drying a synthetic resin emulsion, which powder is capable of forming an emulsion in a case where the re-emulsifiable resin powder is re-emulsified by being mixed with an aqueous medium (e.g., water). The re-emulsifiable resin powder has a structure in which the synthetic resin is coated with an emulsifier even when the re-emulsifiable resin powder is in a dry state. The re-emulsifiable resin powder therefore can be re-emulsified when mixed with an aqueous medium.

The re-emulsifiable resin powder mainly contributes to connecting the electrode materials. Meanwhile, it is demonstrated in Examples (described later) that the binder in accordance with an embodiment of the present invention containing the re-emulsifiable resin powder can improve the heat resistance of the electrode, as compared to a binder obtained by simply mixing the synthetic resin emulsion, the inorganic particles, and the metal-crosslinking thickening agent. It is inferred that this is because the inorganic particles can be more uniformly dispersed by the metal-crosslinking thickening agent in a case where the re-emulsifiable resin powder coated with the inorganic particles is used, as compared to a case where the inorganic particles are simply mixed with the synthetic resin emulsion.

The drying can be carried out by any drying method which is not particularly limited. The drying method can be a well-known method. Examples of the drying method include spray drying, freeze drying, and hot-air drying after coagulation. Among others, spray drying is preferable, from the viewpoint of production speed and cost. In the case of the spray drying, spraying can be carried out in any way which is not particularly limited. The spraying can be carried out by, for example, using a disc spray dryer or a nozzle spray dryer. It is possible to use, as a heat source in the spray drying, for example, hot air or heated water vapor. It is possible to select, as appropriate, conditions for the spray drying in accordance with a size and/or a type of a spray dryer, a solid content, a viscosity, and/or a flow rate of an aqueous emulsion, and/or the like. The spray drying is carried out typically at a temperature in a range of approximately 80° C. to 150° C.

It is preferable that the inorganic particles be added before drying. This makes it possible to obtain the re-emulsifiable resin powder coated with the inorganic particles.

The synthetic resin contained in the re-emulsifiable resin powder has a glass transition temperature (Tg) of preferably −50° C. to 35° C., and more preferably −40° C. to 25° C. Specific examples of the synthetic resin include a polyacrylic acid copolymer resin and a conjugated diene polymer. In other words, it is possible to preferably use, as the synthetic resin emulsion, any of resin emulsions each of which has been developed for use in batteries, such as an emulsion of the polyacrylic acid copolymer resin and an emulsion of the conjugated diene polymer. Further, the synthetic resin can be an emulsion whose dispersion is stabilized by, for example, a protective colloid.

The "emulsion of the polyacrylic acid copolymer resin" is an emulsion of a copolymer resin, which emulsion is obtained by emulsion polymerization of an acrylic acid monomer or a (meth)acrylic acid ester monomer with, for example, another reactive monomer in water. The (meth)acrylic acid ester monomer is a general term for acrylic acid esters and methacrylic acid esters.

Examples of the (meth)acrylic acid ester here include a (meth)acrylic acid alkyl ester having an alkyl group having 1 to 16 carbon atoms, such as methyl (meth)acrylate, ethyl (meth)acrylate, propyl (meth)acrylate, n-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, and lauryl (meth)acrylate, and preferably, a (meth)acrylic acid alkyl ester having 1 to 4 carbon atoms.

Examples of the "another reactive monomer" include: vinylidene fluoride monomers; styrene monomers such as styrene, α-methyl styrene, vinyl toluene, t-butyl styrene, methyl vinyl benzoate, vinyl naphthalene, and divinyl benzene; ethylenically unsaturated monomers containing a nitrile group, such as α,β-unsaturated nitrile monomers such as acrylonitrile, methacrylonitrile, α-chloroacrylonitrile, crotonnitril, α-ethyl acrylonitrile, α-cyanoacrylate, vinylidene cyanide, and fumaronitrile; diene monomers such as butadiene and isoprene; ethylenically unsaturated monomers containing a carboxylic acid, such as monofunctional monomers such as methacrylic acid and acrylic acid, fumaric acid, maleic acid, itaconic acid, citraconic acid, mesaconic acid, glutaconic acid, 1,2,3,6-tetrahydrophthalic acid, 3-methyl-1,2,3,6-tetrahydrophthalic acid, 4-methyl-1,2,3,6-tetrahydrophthalic acid, methyl-3,6-endo-methylene-1,2,3,6-tetrahydrophthalic acid, exo-3,6-epoxy-1,2,3,6-tetrahydrophthalic acid, and nadic acid; anhydrides of the ethylenically unsaturated monomers containing a carboxylic acid; saponified products of the anhydrides; ethylenically unsaturated monomers containing a ketone group, such as methyl vinyl ketone, ethyl vinyl ketone, isopropyl vinyl ketone, isobutyl vinyl ketone, t-butyl vinyl ketone, and hexyl vinyl ketone; and ethylenically unsaturated monomers containing an organic acid vinyl ester group, such as vinyl formate, vinyl acetate, vinyl propionate, vinyl butyrate, vinyl isobutyrate, vinyl valerate, vinyl pivalate, vinyl trimethylacetate, vinyl caproate, vinyl caprylate, vinyl laurate, vinyl palmitate, vinyl stearate, vinyl benzoate, vinyl versatate, and 2-ethylhexanoic acid vinyl.

Examples of the emulsion of the conjugated diene polymer include: an emulsion of a styrene-butadiene copolymer rubber; and an emulsion of a conjugated diene polymer having not less than 4 carbon atoms, such as isoprene and 1,3-pentadiene. The "styrene-butadiene copolymer rubber" is particles made of a copolymer of styrene and butadiene, and has a copolymer component derived from styrene and a copolymer component derived from butadiene. The copolymer component derived from styrene is contained in an amount of preferably 50 mol % to 80 mol %, relative to all copolymer components constituting the styrene-butadiene copolymer. The copolymer component derived from butadiene is contained in an amount of preferably 20 mol % to 50 mol %, relative to the all copolymer components.

The styrene-butadiene copolymer can contain another reactive monomer(s) in addition to the copolymer component derived from styrene and the copolymer component derived from butadiene. It is possible to use, as the "another reactive monomer", for example, substances described earlier as components of the "emulsion of the polyacrylic acid copolymer resin".

In a case where the styrene-butadiene copolymer has the another reactive monomer, the another reactive monomer is preferably contained in an amount of 1 mol % to 30 mol %, relative to the all copolymer components constituting the styrene-butadiene copolymer. The styrene-butadiene copolymer can be any of a random copolymer, a block copolymer, and a graft copolymer. Further, the styrene-butadiene copolymer can be a carboxy-modified polymer.

The "emulsion of the styrene-butadiene copolymer rubber" is an emulsion of rubber particles, which emulsion is obtained by emulsion polymerization of a styrene monomer and a butadiene monomer, and if needed, the another reactive monomer, in water. The "emulsion of the styrene-butadiene copolymer rubber" may be called latex or synthetic rubber latex.

The emulsion polymerization in preparing the emulsion of the polyacrylic acid copolymer resin or the emulsion of the styrene-butadiene copolymer rubber can be carried out by, for example, a general emulsion polymerization method such as a soap-free emulsion polymerization method or a seed polymerization method. For example, the emulsion can be prepared by: (i) first, setting, in a stirrer with a heater, a hermetically-closed container which is filled with inert gas; (ii) introducing, into the hermetically-closed container, monomers for reaction, an emulsifier, a polymerization initiator, and water, and if needed, a dispersing agent, a chain transfer agent, a pH adjuster, and/or the like, and mixing these together; (iii) emulsifying, in water, the monomers etc. which are being heated and stirred; and (iv) copolymerizing the monomers with each other by further heating and stirring.

The emulsion polymerization can be carried out by shearing or using ultrasound instead of stirring. It is possible to use, as emulsifying equipment, a homodisper, a homogenizer, an ultrasonic homogenizer, a centrifugal mixer, a high-speed rotating mixer, a shear mixer, a blender, or the like.

Examples of the emulsifier include anionic surfactants such as a dodecyl benzene sulfonate and an aliphatic sulfonate; cationic surfactants such as a polyethylene glycol alkyl ether and a polyethylene glycol alkyl ester; and amphoteric surfactants.

Examples of the polymerization initiator include: inorganic peroxides such as ammonium persulfate and potassium perphosphate; organic peroxides such as t-butyl peroxide, cumen hydroperoxide, p-mentane hydroperoxide, di-t-butyl peroxide, t-butylcumyl peroxide, dibenzoyl peroxide, 3,5,5-trimethylhexanoyl peroxide, and t-butyl peroxyisobutyrate; and azo compounds such as azobisisobutyronitrile, azobis-2,4-dimethyl valeronitrile, azobiscyclohexane carbonitrile, and methyl azobisisobutyrate.

The emulsion is not particularly limited in structure. The emulsion can have, for example, an intramolecularly crosslinked structure, an intermolecularly crosslinked structure, or a composite structure such as a core-shell structure. The copolymer in the emulsion is not particularly limited in shape of particles. The particles of the copolymer can have a spherical shape, a plate-like shape, a hollow structure, a composite structure, or the like. The particles of the copolymer can have two or more kinds of structures in combination. Meanwhile, each of the polyacrylic acid copolymer resin and the styrene-butadiene copolymer rubber can have two or more composition types.

<1-2. Inorganic Particles>

In the binder in accordance with an embodiment of the present invention, the re-emulsifiable resin powder is coated with inorganic particles. In other words, the inorganic particles are present on the surface of the re-emulsifiable resin powder. Specifically, the re-emulsifiable resin powder is structured such that a synthetic resin is coated with an emulsifier and further with the inorganic particles which are present on an outer side of the emulsifier. In other words, the re-emulsifiable resin powder can be structured such that the inorganic particles are bound to the synthetic resin via the emulsifier.

The binder in accordance with an embodiment of the present invention makes it possible to uniformly protect the electrode active material by the inorganic particles, regardless of whether the inorganic particles themselves have heat resistance. This allows for improvement of the heat resistance of the electrode. Note however that preferably, the inorganic particles themselves also have heat resistance. The expression "having heat resistance" as used in the present specification means that heat is released as soon as a specified temperature or higher is reached. For example, it is preferable that the inorganic particles release heat as soon as the temperature of the inorganic particles reaches approximately 100° C. or higher. When the inorganic particles are heated to a temperature of approximately 100° C. or higher, part or all of crystal water contained in the inorganic particles is removed. As a result, part or all of the crystal water contained in the inorganic particles exhibits an endothermic characteristic, and releases heat. For example, even in a case where a large amount of heat occurs locally in a system when a battery is short-circuited, it is possible to prevent, by an endothermic effect of the inorganic particles, the battery from heating to a greater extent. This makes it possible to prevent heat damage of each battery element, such as heat deterioration of an active material, a conductive auxiliary agent, and a binder, and melting of a separator, and to stop heating of the battery.

The inorganic particles can also act as a glidant for preventing a blocking phenomenon of the re-emulsifiable resin powder. Note that the blocking phenomenon is a phenomenon in which caking and agglomeration of the emulsion occurs during drying of the emulsion and a resultant dried powder has an increased size. In other words, it is preferable that the inorganic particles have a blocking-preventing property. The expression "having a blocking-preventing property" means having a characteristic which prevents the above-described blocking phenomenon, that is, prevents an increase in size of the re-emulsifiable resin powder.

From the viewpoint of exhibition of a heat-resisting effect and from the viewpoint of prevention of the blocking phenomenon in preparation of the re-emulsifiable resin powder, the inorganic particles are made of preferably calcium carbonate, talc, mica, pyrophyllite, clay, dolomite, silicic acid anhydride, kaolin, silicon dioxide, aluminum hydroxide, aluminum silicate, aluminum oxide (alumina), a hydrate of aluminum oxide (boehmite (AlOOH), gibbsite (Al (OH)$_3$)), magnesium oxide, calcium oxide, titanium oxide, barium titanate (BaTiO$_3$), or zirconium oxide (ZrO$_2$), or a mixture thereof. It is possible to use, as the inorganic particles, inorganic particles of one kind alone or of two or more kinds in combination.

The inorganic particles have an average particle diameter of preferably 0.05 μm to 10 μm, and more preferably 0.1 μm to 10 μm, from the viewpoint of adhesion to the re-emulsifiable resin powder and from the viewpoint of uniform dispersion by a metal-crosslinking thickening agent. Note that the average particle diameter of the inorganic particles as used in the present specification means a value which is calculated from a particle diameter distribution measured by a laser diffraction method with use of a bulk density measuring device MT-3300 (manufactured by Microtrac).

The inorganic particles are contained in an amount of preferably 1% by weight to 40% by weight, and more preferably 2% by weight to 30% by weight with respect to a total amount of 100% by weight of the re-emulsifiable resin powder and the inorganic particles. In a case where the amount of the inorganic particles contained is not less than 1% by weight, the heat resistance and the blocking-preventing property can be more effective. On the other hand, in a case where the amount of the inorganic particles contained is not more than 40% by weight, it is possible to easily ensure adhesion between the electrode active material and an electrode substrate.

The inorganic particles are not particularly limited in shape. The inorganic particles can have a spherical shape, a needle shape, a fiber shape, a scale-like shape, a flat plate shape, an amorphous shape, or the like. The shape of the inorganic particles is preferably the scale-like shape or the flat plate shape, from the viewpoint of a mechanical characteristic and heat conductivity.

<1-3. Metal-Crosslinking Thickening Agent>

The binder in accordance with an embodiment of the present invention contains a metal-crosslinking thickening agent, which forms a hydrophobic gel by being crosslinked, in an aqueous system, via metal ions derived from an electrode active material. The "metal ions derived from an electrode active material" as used in the present specification means metal ions which may be generated from the electrode active material. Further, the "metal-crosslinking thickening agent" means a substance having a nature with which the metal-crosslinking thickening agent (i) increases in viscosity as a result of being crosslinked via the metal ions in the aqueous system and (ii) binds to metal and forms a hydrophobic gel.

The metal-crosslinking thickening agent functions as a dispersing agent for the inorganic particles. Specifically, the metal-crosslinking thickening agent causes the inorganic particles on the re-emulsifiable resin powder to be separated from the re-emulsifiable resin powder and to be uniformly dispersed. Then, the metal-crosslinking thickening agent forms a crosslink with a transition metal on the electrode active material. This allows the inorganic particles and the metal-crosslinking thickening agent to uniformly and entirely protect the electrode active material.

The following discusses a more specific aspect as an aspect in which the metal-crosslinking thickener "forms a hydrophobic gel by being crosslinked, in an aqueous system, via metal ions derived from an electrode active material". First, the metal-crosslinking thickening agent comes in contact with the electrode active material. Then, the metal-crosslinking thickening agent is crosslinked with a metal (e.g., transition metal) constituting the electrode active material, at an interface where the metal-crosslinking thickening agent and the electrode active material are in contact with each other. That crosslinking occurs via polyvalent metal ions (e.g., transition metal ions), which are generated from the surface of the electrode active material due to a small amount of water. This crosslinking reaction results in formation of the hydrophobic gel derived from the metal-crosslinking thickening agent, on the surface of the electrode active material.

In an embodiment of the present invention, the hydrophobic gel contains the inorganic particles. This makes it possible to coat the surface of the electrode active material with the hydrophobic gel containing the inorganic particles. Therefore, the hydrophobic gel functions to protect the electrode active material from heat. This makes it possible to improve performance of an electrochemical device in a high-temperature environment. In other words, since the binder in accordance with an embodiment of the present invention has a high heat resistance, it is possible to construct a long-life electrochemical device excellent in high-temperature endurance.

Examples of the metal-crosslinking thickening agent include: alginic acid and a salt thereof, fucoidan, alginic acid ester, karaya gum, carrageenan and a salt thereof, pectine, gellan gum, glucomannan, locust bean gum, xanthane gum, glucose, mannose, galactose, arabinose, fucose, ribose, fructose, carboxymethyl starch, carboxymethyl cellulose and a salt thereof, hydroxyethyl cellulose, hydroxypropyl methylcellulose, dextran, hyaluronic acid, and a mixture thereof. It is possible to use only one of the above metal-crosslinking thickening agents or two or more of the above metal-crosslinking thickening agents in combination.

Examples of the above salt include a lithium salt, a sodium salt, a potassium salt, a magnesium salt, a mercury salt, and an ammonium salt.

It is preferable that the metal-crosslinking thickening agent have a molecular weight which allows a 1% viscosity to be in a range of 60 cP to 6000 cP. This allows the inorganic particles to be more uniformly dispersed. The "1% viscosity" as used in the present specification means a value which is obtained by measuring a 1% by weight aqueous solution of the metal-crosslinking thickening agent at 25° C. with use of a type B viscometer. In a case where the 1% viscosity of the metal-crosslinking thickener is not less than 60 cP, the binder can have a viscosity that is moderate. Accordingly, in this case, the inorganic particles can be easily dispersed. On the other hand, in a case where the 1% viscosity of the metal-crosslinking thickener is not more than 6000 cP, the viscosity of the binder is not too high and accordingly, the binder exhibits a moderate fluidity. Therefore, in this case, the electrode can be produced without difficulty. In a case where the viscosity is insufficient, for example, carboxymethyl cellulose can be additionally added as a thickener.

The weight ratio of the metal-crosslinking thickening agent to the re-emulsifiable resin powder is in a range of preferably 65:35 to 90:10, more preferably 66:34 to 86:14, and still more preferably 66:34 to 80:20. In a case where the weight ratio of the metal-crosslinking thickening agent is not less than 65%, the inorganic particles can be more easily dispersed. On the other hand, in a case where the weight ratio of the metal-crosslinking thickening agent is not more than 90%, the viscosity of the binder is not too high and accordingly, the inorganic particles can be more easily dispersed. In a case where the weight ratio of the re-emulsifiable resin powder is not less than 10%, adhesion strength between the electrode active material and the electrode substrate increases. Meanwhile, in a case where the weight ratio of the re-emulsifiable resin powder is not more than 35%, it is possible to suppress an increase in electric resistance of the electrode.

Note that since coating the surface of the electrode active material makes it possible to prevent a contact between the electrode active material and water which is present in, for example, the slurry for the electrode, it is possible to prevent hydrolysis of the electrode active material. Further, since the electrode active material coated with the hydrophobic gel becomes hydrophobic, the electrode active material never swells with water. Therefore, even in a case where a high-nickel active material and/or the like, which easily undergoes hydrolysis, is used, it is possible to fully utilize the performance of the high-nickel active material and/or the like.

In the aqueous system, the metal ions (alkali metal ions and transition metal ions) derived from the electrode active material may be eluted into the slurry for the electrode, due to hydrolysis of the electrode active material. In a case where the alkali metal ions and the transition metal ions derived from the electrode active material are eluted into an electrolyte while an electrochemical device such as a battery is being constructed, alteration in crystal structure of the electrode active material may occur and result in a decrease in capacity. Further, the transition metal ions which have eluted into the electrolyte may deposit on the surface of a negative electrode. This may cause an internal short circuit. In particular, although the high-nickel active material advantageously contributes to an increased electrode capacity, the high-nickel active material easily undergoes hydrolysis. Therefore, the above-described problem associated with hydrolysis is a significant problem of the high-nickel active material.

However, in the binder in accordance with an embodiment of the present invention, the metal-crosslinking thickening agent can seal, by crosslinking, the metal ions having eluted from the electrode active material. This makes it possible to prevent elution of the alkali metal ions and the transition metal ions into the electrolyte and deposition of the transition metal ions on the surface of the negative electrode. Therefore, the electrode active material can be prevented from deteriorating, so that the life duration of the electrochemical device can be extended.

[2. Method of Producing Binder]

The binder in accordance with an embodiment of the present invention can be prepared by uniformly mixing and dispersing, with use of a dispersing device, (i) the re-emulsifiable resin powder coated with the inorganic particles and (ii) the metal-crosslinking thickening agent. The dispersing device can be of a simple mixing type or a pulverizing-mixing type. It is possible to use, as such a dispersing device, for example, a jet mill, a sand mill, a ball mill, a bead mill, an LMZ mill, a DCP pearl mill, a planetary ball mill, a rocking mill, a V-shaped mixer, a double cone mixer, a container blender, a ribbon mixer, a homogenizer, a twin screw kneading extruder, or a thin-film spin system high-speed mixer.

It is preferable that the binder have an average particle diameter which is equivalent to that of the electrode active material. Accordingly, the binder has an average particle diameter D50 of preferably not more than 20 μm, and more preferably not more than 10 μm. The average particle diameter of the binder can be calculated from an average particle diameter distribution which is measured by a laser diffraction method with use of a bulk density measuring device MT-3300 (manufactured by Microtrac).

A method of confirming that a resultant product is the binder in accordance with an embodiment of the present invention includes, for example, a component detection method which applies a colorimetric assay method to an aqueous solution containing the binder or a detection method using measurement of powder of the binder by FT-IR.

In a case where an aqueous solution containing the active material to be used is acidic or basic due to influence of hydrolysis or the like, the binder containing a neutralizer (described later) can be used.

In a case where the re-emulsifiable resin powder is insufficient in re-emulsifiability, dispersibility, and/or fluidity in water, it is possible to add an aqueous additive such as gelatin, polyvinyl pyrrolidone, and/or carboxymethyl cellulose (CMC). The aqueous additive is preferably added to the synthetic resin emulsion prior to drying. The aqueous additive is added to the synthetic resin emulsion prior to drying in an amount of preferably 1 part by weight to 20 parts by weight with respect to 100 parts by weight of an involatile content of that synthetic resin emulsion. In a case where the amount of the additive added is too small, the additive is not effective. On the other hand, in a case where the amount of the additive added is too large, the viscosity of the synthetic resin emulsion is too high.

[3. Slurry for Electrode]

The slurry for the electrode in accordance with an embodiment of the present invention contains the binder described above, the electrode active material, and water. The electrode active material can be either a positive electrode active material or a negative electrode active material, and is particularly preferably an alkali metal complex oxide.

Examples of the alkali metal complex oxide which can be used as the positive electrode active material of a lithium-ion secondary battery include the following lithium complex oxides: lithium nickelate [$LiNiO_2$ (hereinafter, referred to as "LNO")]; a ternary material [$LiNi_{0.33}Co_{0.33}Mn_{0.33}O_2$ (hereinafter, referred to as "NCM111")]; high-nickel ternary materials [$LiNi_{0.5}Co_{0.2}Mn_{0.3}O_2$ (hereinafter, referred to as "NCM532"), $LiNi_{0.6}Co_{0.2}Mn_{0.2}O_2$ (hereinafter, referred to as "NCM622"), and $LiNi_{0.8}Co_{0.1}Mn_{0.1}O_2$ (hereinafter, referred to as "NCM811")]; lithium nickel cobalt aluminum oxide [$LiNi_{0.8}Co_{0.15}Al_{0.05}O_2$ (hereinafter, referred to as "NCA")]; lithium nickel phosphate [$LiNiPO_4$ (hereinafter, referred to as "LNP")]; lithium-rich solid solution system [$Li_2MnO_3$—$LiNi_{0.33}Mn_{0.33}Co_{0.33}O_2$ (hereinafter, referred to as "L2M")]; spinel lithium manganese nickel oxide [$LiNi_{0.5}Mn_{1.5}O_4$ (hereinafter, referred to as "LNM")]; and lithium manganese nickel iron oxide [$LiNi_{0.33}Fe_{0.33}Mn_{0.33}O_2$ (hereinafter, referred to as "NFM")].

There is no problem in using an alkali metal complex oxide containing constituent elements at respective ratios which are different from those in chemical formulae shown above as examples.

The alkali metal complex oxide can alternatively be an alkali metal complex oxide which does not contain nickel. Examples of such an alkali metal complex oxide include lithium cobaltate [$LiCoO_2$ (hereinafter, referred to as "LCO")], lithium manganate ($LiMn_2O_4$), and lithium iron phosphate [$LiFePO_4$ (hereinafter referred to as "LFP")].

The above description has dealt with lithium complex oxides as examples of the alkali metal complex oxide, but the alkali metal complex oxide is not limited to those examples. The alkali metal complex oxide can be changed as appropriate in accordance with a type of the electrochemical device to which the alkali metal complex oxide is applied. For example, in a case where the electrochemical device is a sodium ion secondary battery, it is possible to use a sodium complex oxide which is obtained by replacing lithium in the lithium complex oxide with sodium. On the other hand, for example, in a case where the electrochemical device is a potassium ion secondary battery, it is possible to use a potassium complex oxide which is obtained by replacing lithium in the lithium complex oxide with potassium.

It is possible to use, as the electrode active material, one of the above electrode active materials alone or two or more of the above electrode active materials in combination. Meanwhile, the electrode active material can also be, for example, an electrode active material doped with a small amount of element such as fluorine, boron, aluminum, chrome, zirconium, molybdenum, or iron, or an electrode active material obtained by surface treatment of the surface of the particles of the alkali metal complex oxide with, for example, at least one compound selected from the group consisting of carbon, MgO, $Al_2O_3$, and $SiO_2$.

The electrode active material used together with the binder in accordance with an embodiment of the present invention can be a negative electrode active material made of an alkali metal complex oxide. Examples of such a negative electrode active material include lithium titanate, such as $Li_4Ti_5O_{12}$ or $Li_2Ti_3O_7$ (hereinafter, referred to as "LTO"), and a negative electrode active material obtained by surface treatment of the surface of particles of lithium titanate with, for example, at least one compound selected from the group consisting of carbon, MgO, $Al_2O_3$, and $SiO_2$.

The binder in accordance with an embodiment of the present invention most effectively exhibits its characteristic in a case where the binder is used together with an alkali metal complex oxide containing Ni. However, the electrode active material is not limited to such an alkali metal complex oxide. The binder in accordance with an embodiment of the present invention can also be used together with an electrode active material which is not an alkali metal complex oxide.

The electrode active material can be, for example, at least one compound selected from the group consisting of: activated carbon, graphite, non-graphitizable carbon, graphitizable carbon, silicon (Si), an Si alloy, and silicon oxide which are predoped or not predoped with lithium; transition metal oxides such as $TiO_2$, $Nb_2O_5$, $TiNb_2O_7$, $CuO$, $Cu_2O$, $MnO_2$, $MoO_3$, $V_2O_5$, $CrO_3$, $MoO_3$, $Fe_2O_3$, $Ni_2O_3$ and $CoO_3$; metal chalcogenides such as $TiS_2$, $MoS_2$, and $NbSe_3$, which are predoped or not predoped with lithium; and conductive polymer compounds such as polyacene, polyparaphenylene, polypyrrole, and polyaniline which are predoped or not predoped with lithium.

It is preferable that the slurry for the electrode contain no organic solvent. However, the slurry for the electrode can contain water and an organic solvent which can be mixed at a desired proportion with water. Examples of such an organic solvent include: N-methyl-2-pyrrolidone; dimethyl sulfoxide; and alcohols such as methanol, ethanol, propanol, isopropanol, n-butanol, and t-butanol. It is possible to use one of the above organic solvents alone or two or more of the above organic solvents in combination.

Further, it is possible to use a neutralizer together, in a case where an acid or a base is produced by, for example, hydrolysis of the active material in the slurry. Examples of the neutralizer include: dicarboxylic acids such as malonic acid, succinic acid, and glutaric acid, and salts thereof; alkali metal citrates such as monosodium citrate and disodium citrate; oxoacids which are weakly acidic or weakly basic, such as monosodium phosphate ($NaH_2PO_4$), monopotassium phosphate ($KH_2PO_4$), monolithium phosphate ($LiH_2PO_4$), disodium phosphate ($Na_2HPO_4$), tripotassium phosphate ($K_3PO_4$), trisodium phosphate ($Na_3PO_4$), dilithium phosphate ($Li_2HPO_4$), trilithium phosphate ($Li_3PO_4$), calcium phosphate ($Ca_3(PO_4)_2$), monomagnesium phosphate ($Mg(H_2PO_4)_2$), dimagnesium phosphate ($MgHPO_4$), dipotassium sulfate ($K_2HSO_4$), sodium polyphosphate ($Na_5P_3O_{10}$, $Na_6P_4O_{13}$, etc.), sodium metaphosphate (($NaPO_3)_n$, etc.), orthosilicic acid, metasilicic acid, and metadisilicic acid, and salts thereof; hydroxy acids such as glycolic acid, lactic acid, and malic acid, and salts thereof; and alginic acids (Alg-H) in which a carbonyl group is not bound to any cation except for protons. Note that Alg-H can be also used as the metal-crosslinking thickening agent.

The "oxoaicds which are weakly acidic" are preferably oxoacids having n=0 or n=1 in the second rule of Pauling's rules. Further, the lactic acid and the malic acid each can be a D body, an L body, or a DL body.

The slurry for the electrode can further contain a conductive auxiliary agent. The conductive auxiliary agent is not particularly limited, and can be a metal, a carbon material, a conductive polymer, or conductive glass. Among others, the carbon material is preferable. Examples of the carbon material include nanocarbons such as carbon nanotube, carbon nanofiber, carbon nanohorn, and fullerene, acetylene black, furnace black, thermal black, channel black, Ketjen black (Registered Trademark), Vulcan, graphene, vapor grown carbon fiber (VGCF), and graphite. Among others, the carbon material is more preferably acetylene black. The carbon nanotube can be a single-layer carbon nanotube, a double-layer carbon nanotube, or a multilayer carbon nanotube. It is possible to use one of the above conductive auxiliary agents alone or two or more of the above conductive auxiliary agents in combination.

Further, it is possible to pretreat the carbon material by a surface treatment. Examples of the surface treatment include an oxidation treatment, a graft polymerization reaction, a coupling treatment, a mechanical treatment, a plasma treatment, graphitization, and an activation treatment. Such a pretreatment changes the state of the surface of the carbon material and inhibits agglomeration of the carbon material itself. This makes it possible to improve dispersibility of the carbon material.

[4. Electrode for Electrochemical Device]

The electrode for an electrochemical device in accordance with an embodiment of the present invention contains the binder in accordance with an embodiment of the present invention. For example, it is possible to produce the electrode for the electrochemical device in accordance with an embodiment of the present invention by applying the slurry for the electrode in accordance with an embodiment of the present invention to the electrode substrate (current collector) and drying the slurry. The electrode thus produced includes an electrode mix layer on the surface of the electrode substrate. In other words, the electrode for the electrochemical device has a structure including the electrode mix layer formed on the electrode substrate, which electrode mix layer contains the binder and the electrode active material which are described above and may further include the conductive auxiliary agent.

The slurry for the electrode can be applied by, for example, a method using a knife coater, a comma coater, or a die coater. The electrode substrate can be a substrate made of aluminum foil, copper foil, or the like.

The slurry for the electrode can be applied, in an amount which is not particularly limited, to the electrode substrate. For example, the amount of the slurry to be applied to the electrode substrate can be set so that the electrode mix layer after drying will have a thickness of 0.02 mm to 0.40 mm and preferably 0.05 mm to 0.25 mm.

The step of drying is carried out at a temperature which is not particularly limited. For example, the temperature can be set as appropriate in a range of 50° C. to 180° C., and preferably in a range of 80° C. to 150° C. The step of drying is carried out for a period of time which can be set as appropriate in a range of, for example, 10 seconds to 120 seconds, and preferably 10 seconds to 80 seconds. Meanwhile, it is possible to carry out the step of drying at 120° C. for several hours under reduced pressure. In this case, it is preferable to have a reduced pressure condition where the pressure is not more than 10 Pa.

The electrode for the electrochemical device can be used as a positive electrode or a negative electrode of the electrochemical device.

[5. Electrochemical Device]

The electrochemical device in accordance with an embodiment of the present invention includes: a positive electrode; a negative electrode; and an electrolyte between the positive electrode and the negative electrode, at least one of the positive electrode and the negative electrode including the binder as described above. In other words, the electrochemical device in accordance with an embodiment of the present invention can be said to include the above-described electrode for the electrochemical device, as the at least one of the positive electrode and the negative electrode.

Further, the electrochemical device is provided with a separator between the positive electrode and the negative electrode so that a short circuit between the positive electrode and the negative electrode will be prevented. The positive electrode and the negative electrode include respective current collectors which are both connected to a power source. Charge and discharge are switched to each other by operating the power source.

Examples of the electrochemical device encompass electricity storage devices such as electrochemical capacitors and lithium-ion secondary batteries, and further encompass non-lithium-ion batteries, lithium ion capacitors, dye-sensitized solar cells, and the like. Among others, the electrochemical device in accordance with an embodiment of the present invention is preferably a lithium-ion secondary battery.

The electrochemical device can be used as a highly-safe high-performance electricity storage device. Therefore, the electrochemical device can be mounted on: a compact electronic device such as a mobile phone, a laptop personal computer, a portable digital assistant (PDA), a video camera, or a digital camera; equipment for movement (vehicle), such as an electric bicycle, an electric car, or a train; equipment for power generation such as thermal power generation, wind power generation, hydraulic power generation, nuclear power generation, or geothermal power generation; a natural energy storage system; or the like.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will specifically discuss embodiments of the present invention with reference to Examples and Comparative Examples. Note, however, that the present invention is not limited to the following Examples and Comparative Examples.

Examples 1 to 5

For production of each re-emulsifiable resin powder, a styrene butadiene rubber emulsion (DIC Corporation, LACSTAR DS-410) and an acrylic emulsion (Murayama Chemical Laboratory Co., Ltd., F-35) were prepared in the form of an aqueous dispersion (emulsion). Table 1 shows inorganic particles, a metal-crosslinking thickening agent, and the aqueous dispersion (emulsion), which were used in each of Examples.

TABLE 1

|  |  | Example 1 | Example 2 | Example 3 | Example 4 | Example 5 |
|---|---|---|---|---|---|---|
| Inorganic particles | Talc (Nippon Talc, Talc S) | ✓ |  |  |  |  |
|  | Magnesium oxide (Hongwu new material, R652) |  | ✓ |  |  |  |
|  | Aluminum silicate (Evonik, Sipernat 820) |  |  | ✓ |  |  |
|  | Calcium carbonate (Shiraishi Kogyo, CCR) |  |  |  | ✓ |  |
|  | Silicon dioxide (Nippon AEROSIL, R972) |  |  |  |  | ✓ |
| Metal-crosslinking thickening agent | Sodium (Na) alginate | ✓ |  |  |  |  |
|  | Ammonium (NH$_4$) alginate |  | ✓ |  |  |  |
|  | Lithium (Li) alginate |  |  | ✓ |  |  |
|  | Sodium (Na) iota-carrageenan |  |  |  | ✓ |  |
|  | Carboxymethyl cellulose lithium (Li) |  |  |  |  | ✓ |
| Aqueous dispersion (emulsion) | Acrylic | ✓ |  | ✓ |  | ✓ |
|  | Styrene-butadiene rubber |  | ✓ |  | ✓ |  |

First, the emulsion and the inorganic particles were mixed at a weight ratio of the emulsion to the inorganic particles of 90:10. A mixture thus obtained was subjected to spray drying, with hot air at 100° C. as a heat source, by using a spray nozzle spray dryer (SD-1010, Tokyo Rikakikai Co, Ltd.). This gave a re-emulsifiable resin powder whose surface was coated with the inorganic particles.

Into a ball mill container, 3.8 parts by weight of the re-emulsifiable resin powder coated with the inorganic particles, 12.6 parts by weight of the metal-crosslinking thickening agent, and 7 parts by weight of heptane as a dispersion medium were added. Further, 15 parts by weight of zirconia balls having a diameter of 1.0 mm were added as grinding balls. These were subjected to a mixing process at room temperature for one hour. Thereafter, the zirconia balls were removed, so that a binder in the form of powder was obtained. After the binder was cleaned with methanol, the binder was dried at 100° C. for not less than 24 hours under reduced pressure.

Then, 4 parts by weight of the binder thus dried, 93 parts by weight of NCM111 as an electrode active material, and 3 parts by weight of acetylene black as a conductive auxiliary agent were mixed together. A resultant mixture, to which 25 parts by weight of water was added, was kneaded by use of a planetary mixer (PRIMIX Corporation, T.K. HIVIS MIX), so that a slurry for an electrode was prepared.

The slurry for the electrode was applied in a band form, by a roller coating method, to both sides of a long aluminum foil (current collector) having a thickness of 15 μm so that a weight per unit area per surface will be 12 mg/cm$^2$. The weight per unit area is an electrode active material-weight basis value. Then, the slurry was dried at a drying temperature of 100° C. for 80 seconds. This produced a coated electrode including an electrode mix layer which was formed on the current collector. The coated electrode was subjected to rolling with use of a roll press machine, so that the filling density of the electrode active material was adjusted to 3.0 g/cc. As a result, a positive electrode sheet was obtained.

In each of Examples, positive electrode sheets were similarly prepared as described above by using, as respective electrode active materials, LNM, LCO, LFP, and NCA. Further, in each of Examples, a negative electrode sheet was also prepared. In preparation of the negative electrode sheet, the electrode active material was changed to LTO, which was Li$_4$Ti$_5$O$_{12}$.

Comparative Examples 1 to 5

First, 93 parts by weight of NCM111 as an active material, 3 parts by weight of acetylene black as a conductive auxiliary agent, and 4 parts by weight of an aqueous binder (iElectrolyte, IEB-P01) for a positive electrode were mixed together. A resultant mixture, to which 25 parts by weight of water was added, was kneaded by use of a planetary mixer (PRIMIX Corporation, T.K. HIVIS MIX), so that a slurry for an electrode was prepared.

The slurry for the electrode was applied in a band form, by a roller coating method, to both sides of a long aluminum foil (current collector) having a thickness of 15 μm so that a weight per unit area per surface will be 12 mg/cm². The weight per unit area is an electrode active material-weight basis value. Then, the slurry was dried at a drying temperature of 100° C. for 80 seconds. This produced a coated electrode including an electrode mix layer which was formed on the current collector. The coated electrode was subjected to rolling with use of a roll press machine, so that the filling density of the electrode active material was adjusted to 3.0 g/cc. As a result, a positive electrode sheet was obtained.

Thereafter, a mixed solution was prepared by mixing and dispersing talc particles (Nippon Talc Co., Ltd., Talc S, average particle diameter: 1 μm) in a mixed solvent of ethyl alcohol and isopropyl alcohol so that the mixed solution would have a talc particle concentration of 10% by mass. The mixed solution was applied in a band form, by a roller coating method, to the positive electrode sheet. Then, the mixed solution thus applied was dried at a drying temperature of 100° C. for 80 seconds. Application and drying of the mixed solution was repeated until the amount of a layer of the talc particles reaches 0.092% by mass with respect to a total weight of the positive electrode sheet. As a result, a positive electrode sheet of Comparative Example 1 was obtained. The positive electrode sheet of Comparative Example 1 had an inorganic coating layer formed on the surface of the electrode mix layer.

Further, the following positive electrode sheets of Comparative Examples 2 to 5 were prepared, respectively, by using materials described below as the inorganic particles in place of talc particles: a positive electrode sheet of Comparative Example 2 using magnesium oxide (Hongwu New Materials Institute Co., Limited, R652); a positive electrode sheet of Comparative Example 3 using aluminum silicate (Evonik Industries AG., Sipernat 820); a positive electrode sheet of Comparative Example 4 using calcium carbonate (Shiraishi Kogyo Kaisha, Ltd., CCR); and a positive electrode sheet of Comparative Example 5 using silicon dioxide (Nippon AEROSIL CO., LTD., R972).

Further, in each of Comparative Examples, positive electrode sheets were similarly prepared as described above by using as respective electrode active materials, LNM, LCO, LFP, and NCA. In addition, in each of Comparative Examples, a negative electrode sheet was also prepared. In preparation of the negative electrode sheet, the electrode active material was changed to LTO and the binder was changed to an aqueous binder (iElectrolyte, IEB-B03) for a negative electrode.

[Construction of Lithium-Ion Secondary Battery]

The positive electrode sheet or the negative electrode sheet prepared above, a separator sheet, and metal lithium foil were stacked in this order, so that a laminate was obtained. This laminate was put in a CR2302 coin cell case. Into this coin cell case, a nonaqueous electrolyte was introduced. Then, the coin cell case was sealed by application of pressure with use of a crimping device while a stainless-steel cap was placed on an insulating washer which was provided on a periphery of the coin cell case. As a result, a lithium ion coin cell battery was constructed. This lithium ion coin cell battery was used as an evaluation cell. Note that the separator sheet which employed was a separator sheet which had a three-layer structure in which polypropylene layers (PP) were provided on both surfaces of a polyethylene (PE) layer and which had a thickness of 20 μm. The nonaqueous electrolyte was a nonaqueous electrolyte in which $LiPF_6$ as a supporting salt was dissolved at a concentration of 1.0 mol/L in a mixed solvent containing ethylene carbonate (EC) and dimethyl carbonate (DMC) at a volume ratio of EC:DMC=1:1.

[Evaluation Test 1: Evaluation of Cycle Characteristic at High Temperature]

In order to confirm that heat resistance was improved in Examples as compared to Comparative Examples corresponding to conventional techniques, evaluation cells each including the positive electrode sheet and the negative electrode sheet as described above were evaluated with regard to a storage characteristic at high temperature. Specifically, a discharge capacity maintaining ratio after 200 hours was calculated for each of the evaluation cells and compared as follows. Table 2 shows electrode active materials which were evaluated, and an electric current value and a voltage range which were used in measurement of each of the evaluation cells containing the electrode active materials, respectively.

TABLE 2

|  | Measured current value at 1.0 C [mA/g] | Upper limit voltage [V] | Lower limit voltage [V] |
| --- | --- | --- | --- |
| NCM111 | 155 | 4.3 | 2.5 |
| LCO | 176 | 4.4 | 2.5 |
| LNM | 131 | 4.9 | 3.0 |
| NCA | 210 | 4.3 | 2.5 |
| LFP | 155 | 4.0 | 2.0 |
| LTO | 170 | 2.0 | 1.0 |

<Initial Charge and Discharge Test>

First, each of the evaluation cells was charged in a constant current-constant voltage mode (CC-CV mode) in which a charging electric current value was set at 0.1 C. Note that in a CV mode, charging was ended at a point in time when an electric current value became a tenth of a value of a set electric current in a constant current mode (CC mode).

Next, the evaluation cell was discharged in a CC mode in which a discharge electric current value was set at 0.1 C. The voltage range was as shown in Table 2, and the temperature in measurement was 25° C.

<Storage Test at 80° C.>

Each of the evaluation cells having undergone the initial charge and discharge test was stored at 80° C. for 200 hours, while being charged under conditions of the charging electric current value set at 0.1 C and a storage voltage set at 4.2 V.

Thereafter, the temperature was decreased back to 25° C. and then, the evaluation cell was discharged in a CC mode in which the discharge electric current value was set at 0.1 C. At a point in time when the voltage decreased to a lower-limit voltage shown in Table 2 above, discharging was ended.

<Calculation of Discharge Capacity Maintaining Ratio>

The discharge capacity maintaining ratio was calculated by the following formula from (i) a discharge capacity value of an initial cycle, which was obtained in the initial charge and discharge test described above, and (ii) a discharge capacity value after storage at 80° C., which was obtained in a storage test at 80° C.:

discharge capacity maintaining ratio [%]=(discharge capacity value after storage at 80° C.)/(discharge capacity value in initial cycle)×100.

Further, the discharge capacity maintaining ratio calculated as described above was evaluated with reference to the following criteria.

S: The discharge capacity maintaining ratio is not less than 95%.
A: The discharge capacity maintaining ratio is not less than 90% and less than 95%.
B: The discharge capacity maintaining ratio is not less than 88% and less than 90%.

Note that evaluation cells evaluated as S and A were regarded as acceptable, whereas evaluation cells evaluated as B were regarded as unacceptable.

<Results of Evaluation>
Table 3 shows results of the above evaluation.

TABLE 3

| Active material | Example 1 | Comparative Example 1 | Example 2 | Comparative Example 2 | Example 3 | Comparative Example 3 | Example 4 | Comparative Example 4 | Example 5 | Comparative Example 5 |
| --- | --- | --- | --- | --- | --- | --- | --- | --- | --- | --- |
| NCM111 | S | B | S | B | S | B | S | B | S | B |
| LCO | S | B | S | B | S | B | S | B | S | B |
| LNM | S | B | A | B | A | B | A | B | S | B |
| NCA | S | B | A | B | A | B | S | B | S | B |
| LFP | S | B | S | B | S | B | S | B | S | B |
| LTO | S | B | S | B | S | B | s | B | S | B |

The discharge capacity maintaining ratio was improved in Examples 1 to 5 in each of which the electrode active material was entirely protected by a combination of (i) the re-emulsifiable resin powder coated with the inorganic particles and (ii) the metal-crosslinking thickening agent, as compared to Comparative Examples 1 to 5 in each of which only the surface of an electrode was protected by inorganic particles. In other words, it was clarified that the electrode can have an improved heat resistance by using the binder in accordance with an embodiment of the present invention.

[Evaluation Test 2: Evaluation of Characteristic Based on Composition Ratio]

Positive electrode sheets were prepared so as to have different weight ratios of the metal-crosslinking thickening agent to the re-emulsifiable resin powder, respectively. Then, influence with respect to heat resistance, which was caused by a change in composition ratio, was examined. Specifically, positive electrode sheets of Examples 6 and 7 were prepared as in Example 1 by using the same materials as those in Example 1 except that NCM111 was used as the active material. The weight ratio of the metal-crosslinking thickening agent to the re-emulsifiable resin powder was adjusted to 85:15 in Example 6 and to 70:30 in Example 7. Then, lithium ion coin cell batteries were constructed by using the positive electrode sheets thus prepared. These lithium ion coin cell batteries were evaluated as in the above evaluation test 1, with regard to respective storage characteristics at high temperature.

<Results of Evaluation>
Table 4 shows results of the above evaluation.

TABLE 4

| | Example 6 | Example 7 |
| --- | --- | --- |
| Weight ratio of metal-crosslinking thickening agent to re-emulsifiable resin powder | 85:15 | 70:30 |
| Result of evaluation of heat resistance | A | S |

As compared to Example 6 in which the weight ratio of the metal-crosslinking thickening agent to the re-emulsifiable resin powder was 85:15, the heat resistance was higher in Example 7 in which that ratio was 70:30.

[Evaluation Test 3: Evaluation of Difference Between Characteristic Obtained by Resin Powder and Characteristic Obtained by Emulsion]

Example 1 using the re-emulsifiable resin powder was compared with Comparative Example 6 using a binder which had not undergone the step of preparing a re-emulsifiable resin powder, that is, the step of spray drying, so that a difference in characteristic between Example 1 and Comparative Example 6 was examined. In other words, Comparative Example 6 employed a binder obtained by simply mixing together the aqueous dispersion (emulsion), the inorganic particles and the metal-crosslinking thickening agent, which were used in Example 1. With regard to this Comparative Example 6, a positive electrode sheet and a negative electrode sheet were prepared as in Example 1 by using respective active materials. Then, lithium ion coin cell batteries were constructed. With regard to each of Example 1 and Comparative Example 6, the discharge capacity maintaining ratio was calculated as follows.

<Initial Charge and Discharge Test>

First, evaluation cells of Example 1 and Comparative Example 6 were charged in a CC-CV mode in which the charging electric current value was set at 0.1 C. Note that in a CV mode, charging was ended at a point in time when an electric current value became a tenth of a value of a set electric current in a CC mode.

Next, the evaluation cells were each discharged in a CC mode in which the discharge electric current value was set at 0.1 C. The voltage range was as shown in Table 2, and the temperature in measurement was 25° C.

<Evaluation of Discharge Capacity Characteristic at 1.0 C Rate>

First, each of the evaluation cells each having undergone the initial charge and discharge test was charged in a CC-CV mode in which the charging electric current value was set at 0.1 C. Note that in a CV mode, charging was ended at a point in time when an electric current value became a tenth of a value of a set electric current in a CC mode.

Next, the evaluation cell was discharged in a CC mode in which the discharge electric current value was set at 1.0 C. The voltage range was as shown in Table 2, and the temperature in measurement was 25° C.

<Calculation of Discharge Capacity Maintaining Ratio>

The discharge capacity maintaining ratio was calculated by the following formula from (i) a discharge capacity value of an initial cycle, which was obtained in the initial charge and discharge test described above, and (ii) a discharge capacity value obtained by evaluation of a discharge capacity characteristic at 1.0 C rate:

discharge capacity maintaining ratio [%]=(discharge capacity value at 1.0 C)/(discharge capacity value in initial cycle)×100.

<Results of Evaluation>

Table 5 shows results of the above evaluation. Note that the term "Initial capacity" in Table 5 means a "discharge capacity value in the initial cycle", and the term "Capacity maintaining ratio" means the "discharge capacity maintaining ratio".

TABLE 5

|  | Initial capacity [mAh/g] | Capacity maintaining ratio [%] |
| --- | --- | --- |
| NCM positive electrode |  |  |
| Example 1 | 155 | 78 |
| Comparative Example 6 | 156 | 69 |
| LCO positive electrode |  |  |
| Example 1 | 181 | 94 |
| Comparative Example 6 | 177 | 90 |
| LFP positive electrode |  |  |
| Example 1 | 157 | 96 |
| Comparative Example 6 | 154 | 93 |
| LNM positive electrode |  |  |
| Example 1 | 132 | 95 |
| Comparative Example 6 | 132 | 88 |
| NCA positive electrode |  |  |
| Example 1 | 205 | 78 |
| Comparative Example 6 | 202 | 69 |
| LTO negative electrode |  |  |
| Example 1 | 171 | 97 |
| Comparative Example 6 | 170 | 92 |

In all cases where any of the electrode active materials shown in Table 5 was used, Example 1 using the re-emulsifiable resin powder had an improved discharge capacity maintaining ratio as compared to Comparative Example 6 which had not undergone the step of preparing a re-emulsifiable resin powder. In light of the above, it was clarified that when the binder in accordance with an embodiment of the present invention is used, the electrode can have an improved heat resistance.

INDUSTRIAL APPLICABILITY

An aspect of the present invention relates to a binder which is a material of an electrochemical device. Such an aspect of the present invention can be broadly applied in, for example, industries of capacitors, automobiles, batteries, home appliances, etc.

The invention claimed is:

1. A binder which connects electrode materials of an electrochemical device, the binder comprising:
   a re-emulsifiable resin powder coated with inorganic particles; and
   a metal-crosslinking thickening agent forming a hydrophobic gel by being crosslinked, in an aqueous system, via metal ions derived from an electrode active material;
   wherein the metal-crosslinking thickening agent and the re-emulsifiable resin powder are present in a weight ratio of 65:35 to 90:10, and
   wherein the metal-crosslinking thickening agent is (i) alginic acid or a salt thereof, fucoidan, alginic acid ester, karaya gum, carrageenan or a salt thereof, pectine, gellan gum, glucomannan, locust bean gum, xanthan gum, glucose, mannose, galactose, arabinose, fucose, ribose, fructose, carboxymethyl starch, dextran, or hyaluronic acid, or (ii) a mixture thereof.

2. The binder as set forth in claim 1, wherein:
   the re-emulsifiable resin powder has a structure in which a synthetic resin is coated with an emulsifier.

3. The binder as set forth in claim 2, wherein:
   the synthetic resin has a glass transition temperature in a range of −40° C. to 25° C.

4. The binder as set forth in claim 3, wherein:
   the synthetic resin is an emulsion of a polyacrylic acid copolymer resin or of a conjugated diene polymer.

5. The binder as set forth in claim 1, wherein:
   the inorganic particles are resistant to heat.

6. The binder as set forth in claim 1, wherein:
   the inorganic particles are contained in an amount of 1% by weight to 40% by weight with respect to a total amount of 100% by weight of the re-emulsifiable resin powder and the inorganic particles.

7. The binder as set forth in claim 1, wherein:
   the inorganic particles are made of (i) calcium carbonate, talc, mica, pyrophyllite, clay, dolomite, silicic acid anhydride, kaolin, silicon dioxide, aluminum silicate, aluminum hydroxide, aluminum oxide, a hydrate of aluminum oxide, magnesium oxide, calcium oxide, titanium oxide, barium titanate, or zirconium oxide, or (ii) a mixture thereof.

8. A slurry for an electrode, comprising:
   a binder as recited in claim 1;
   an electrode active material;
   and water.

9. A slurry as set forth in claim 8, further comprising a neutralizer.

10. An electrochemical device comprising:
    a positive electrode;
    a negative electrode; and
    an electrolyte between the positive electrode and the negative electrode, at least one of the positive electrode and the negative electrode including a binder as recited in claim 1.

* * * * *